(12) United States Patent
Cowperthwaite et al.

(10) Patent No.: US 9,122,945 B2
(45) Date of Patent: Sep. 1, 2015

(54) METHOD AND APPARATUS FOR THREE-DIMENSIONAL TRACKING OF INFRA-RED BEACONS

(71) Applicants: David J. Cowperthwaite, Portland, OR (US); Bradford H. Needham, North Plains, OR (US)

(72) Inventors: David J. Cowperthwaite, Portland, OR (US); Bradford H. Needham, North Plains, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/694,194

(22) Filed: Nov. 5, 2012

(65) Prior Publication Data

US 2013/0077826 A1 Mar. 28, 2013

Related U.S. Application Data

(63) Continuation of application No. 12/807,004, filed on Aug. 25, 2010, now Pat. No. 8,335,349, which is a continuation of application No. 11/981,291, filed on Oct. 31, 2007, now Pat. No. 7,809,161, which is a continuation of application No. 10/412,482, filed on Apr. 11, 2003, now Pat. No. 7,310,441.

(51) Int. Cl.
| | | |
|---|---|---|
| *G06K 9/00* | (2006.01) | |
| *G06K 9/20* | (2006.01) | |
| *G01S 1/70* | (2006.01) | |
| *G01S 5/16* | (2006.01) | |

(52) U.S. Cl.
CPC ... *G06K 9/20* (2013.01); *G01S 1/70* (2013.01); *G01S 5/16* (2013.01)

(58) Field of Classification Search
USPC .................. 382/100, 103, 154, 285
See application file for complete search history.

(56) References Cited

U.S. PATENT DOCUMENTS

| | | | |
|---|---|---|---|
| 4,815,008 A | 3/1989 | Kadonoff et al. | |
| 6,061,644 A * | 5/2000 | Leis .......................... | 702/153 |
| 6,198,528 B1 | 3/2001 | Maynard | |
| 6,563,462 B1 | 5/2003 | Moffa et al. | |
| 6,567,116 B1 * | 5/2003 | Aman et al. ................. | 348/169 |
| 6,571,024 B1 | 5/2003 | Sawhney et al. | |
| 6,787,750 B1 | 9/2004 | Sauer | |
| 6,801,637 B2 * | 10/2004 | Voronka et al. ............... | 382/103 |
| 6,825,791 B2 | 11/2004 | Sanders et al. | |
| 7,063,256 B2 | 6/2006 | Anderson et al. | |
| 7,310,441 B2 | 12/2007 | Cowperthwaite et al. | |
| 7,809,161 B2 | 10/2010 | Cowperthwaite et al. | |
| 2003/0095186 A1 * | 5/2003 | Aman et al. ................. | 348/162 |
| 2003/0120448 A1 * | 6/2003 | Moriya et al. .................. | 702/95 |
| 2004/0182925 A1 | 9/2004 | Anderson et al. | |
| 2004/0202363 A1 | 10/2004 | Cowperthwaite et al. | |
| 2005/0012055 A1 * | 1/2005 | Chien ...................... | 250/559.01 |
| 2007/0268366 A1 * | 11/2007 | Raskar et al. ................. | 348/143 |
| 2008/0063262 A1 | 3/2008 | Cowperthwaite et al. | |

OTHER PUBLICATIONS

Pang, G. K., et al., "Led Location Beacon System Based on Processing of Digital Images", IEEE Transactions on Intelligent Transportation Systems, vol. 2, No. 3, Sep. 2001, pp. 135-150.
Dorfmuller, K. et al., "Real-Time Hand and Head Tracking for Virtual Environments using Infrared Beacons", ZGDV Computer Graphics Centre, Visual Computing dept. Darmstadt, Germany, 1998, pp. 113-127.

* cited by examiner

*Primary Examiner* — Wesley Tucker
(74) *Attorney, Agent, or Firm* — L. Cho

(57) ABSTRACT

A method for processing data includes identifying a time signature of an infra-red (IR) beacon. Image data associated with the IR beacon is identified using the time signature.

24 Claims, 5 Drawing Sheets

METHOD AND APPARATUS FOR THREE-DIMENSIONAL TRACKING OF INFRA-RED BEACONS

RELATED APPLICATIONS

The present application is a continuation of U.S. patent application Ser. No. 12/807,004, filed on Aug. 25, 2010, entitled "METHOD AND APPARATUS FOR THREE-DIMENSIONAL TRACKING OF INFRA-RED BEACONS" which is hereby incorporated herein by reference in its entirety and for all purposes. Further this above mentioned application Ser. No. 12/807,004, is a continuation of U.S. patent application Ser. No. 11/981,291, filed on Oct. 31, 2007, entitled "METHOD AND APPARATUS FOR THREE-DIMENSIONAL TRACKING OF INFRA-RED BEACONS", now patented as U.S. Pat. No. 7,809,161, granted on Oct. 5, 2010. Further this above mentioned application Ser. No. 11/981,291, is a continuation of U.S. patent application Ser. No. 10/412,482, filed on Apr. 11, 2003, entitled "METHOD AND APPARATUS FOR THREE-DIMENSIONAL TRACKING OF INFRA-RED BEACONS", now patented as U.S. Pat. No. 7,310,441, granted on Dec. 18, 2007.

FIELD

An embodiment of the present invention relates to monitoring and tracking systems. More specifically, an embodiment of the present invention relates to a method and apparatus for three-dimensional tracking of infra-red beacons.

BACKGROUND

Surveillance and monitoring systems have been utilized for years in assisted living facilities and in office buildings. In the future, use of such systems will expand to enable a variety of pervasive computing applications such as resource discovery, point-and-use interfaces, navigation, and augmented reality.

Systems that utilize infra-red technology such as infra-red transmitters and receivers have become common in recent years. In these systems, an infra-red transmitter delivers information such as an identity of the transmitter or a person carrying the transmitter to a infra-red sensor or a plurality of infra-red sensors within its range. No detailed spatial information is extrapolated from this information and thus only limited room-level resolution is provided by the systems.

Recently, various improved indoor monitoring and tracking systems have been developed utilizing ultrasonic technology. These ultrasonic location systems perform trilateration, the principle of position finding using distance measurement. In these systems, short pulses of ultrasound are emitted from an ultrasonic transmitter. The times-of-flight of the pulse to ultrasonic receivers mounted at known locations are measured. Taking into account the speed of sound in air, the distance from the transmitter to each receiver is determined. Given three or more of such distance measurements, the three-dimensional position of the transmitter is calculated. The determination of a precise position of a transmitter or beacon is particularly more useful in monitoring and tracking applications. However, for a facility to replace an existing system utilizing infra-red technology with a new ultrasonic system would require significant cost and time which is undesirable.

Thus, what is needed is a method and apparatus for efficiently and effectively tracking the three-dimensional position of an infra-red beacon that takes advantages of the existing infrastructure available in a facility instead of requiring its replacement.

BRIEF DESCRIPTION OF THE DRAWINGS

The features and advantages of embodiments of the present invention are illustrated by way of example and are not intended to limit the scope of the present invention to the particular embodiments shown, and in which.

DETAILED DESCRIPTION

In the following description, for purposes of explanation, specific nomenclature is set forth to provide a thorough understanding of embodiments of the present invention. However, it will be apparent to one skilled in the art that these specific details may not be required to practice the embodiments of the present invention. In other instances, well-known circuits and devices are shown in block diagram form to avoid obscuring embodiments of the present invention unnecessarily.

Figure 1:
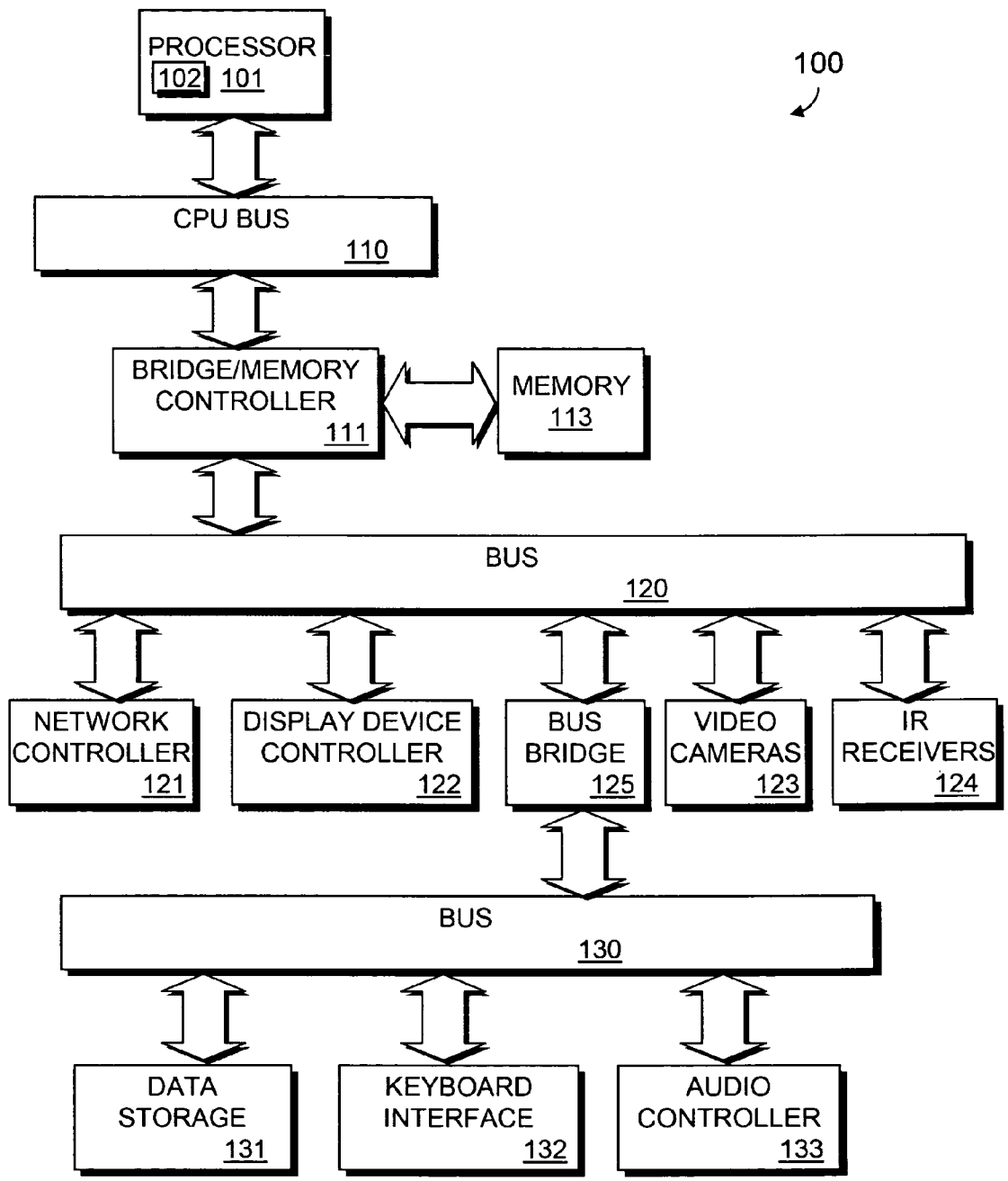
FIG. 1 is a block diagram of a computer system implementing an embodiment of the present invention.

FIG. 1 is a block diagram of an exemplary computer system 100 upon which an embodiment of the present invention can be implemented. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows an embodiment of the present invention implemented on a single processor computer system 100. However, it is understood that an embodiment of the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory device, a static random access memory device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 may link the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device may be a computer monitor, a flat panel display or other display device. The display device receives data signals from the processor 101 through the display device controller 122 and displays the information and data signals to the user of the computer system 100.

A plurality of video cameras 123 are coupled to the first I/O bus 120. The video cameras 123 operate to capture an image of an object. The video cameras 123 may be digital video cameras having internal digital video capture hardware that translates the captured image into digital graphical data. The video cameras 123 may be analog video cameras having digital video capture hardware external to the video camera 123 for digitizing the captured image. The video cameras 123 have the ability to sense infra-red light and are disbursed at locations in a facility where tracking and monitoring of infra-red beacons is desired. The plurality of video cameras 123 may be placed in the facility such that more than one video camera may capture image data from a same region.

A plurality of infra-red receivers 124 are coupled to the first I/O bus 120. The infra-red receivers 124 receive encoded infra-red signals transmitted by infra-red transmitters or beacons (not shown). According to an embodiment of the computer system 100, each of the infra-red beacons has a unique time signature which allows it to transmit its encoded infra-red signals intermittently at a time different from other infra-red beacons in order to minimize signal collision. The encoded infra-red signals may include information such as an identifier. The infra-red receivers convert the encoded infra-red signals to electrical signals which are transmitted to the first I/O bus 120. The infra-red receivers 124 may be disbursed at locations in the facility where tracking and monitoring of infra-red beacons is desired.

A second I/O bus 130 may be a single bus or a combination of multiple buses. As an example, the second I/O bus 130 may comprise a PCI bus, a PCMCIA bus, a NuBus, an Industry Standard Architecture bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130. A bus bridge 125 couples the first I/O bus 120 to the second I/O bus 130. The bus bridge 124 operates to buffer and bridge data signals between the first I/O bus 120 and the second I/O bus 130.

An embodiment of the present invention is related to the use of the computer system 100 to perform three-dimensional tracking of an infra-red beacon. According to one embodiment, three-dimensional tracking of an infra-red beacon is performed by the computer system 100 in response to the processor 101 executing a sequence of instructions in main memory 113. Such instructions may be read into memory 113 from another computer-readable medium, such as data storage device 131, or from another source via the network controller 121. Execution of the sequence of instructions causes the processor 101 to perform three-dimensional tracking of an infra-red beacon, as will be described hereafter. In an alternative embodiment, hardware circuitry may be used in place of or in combination with software instructions to implement an embodiment of the present invention. Thus, the present invention is not limited to any specific combination of hardware circuitry and software.

Figure 2:
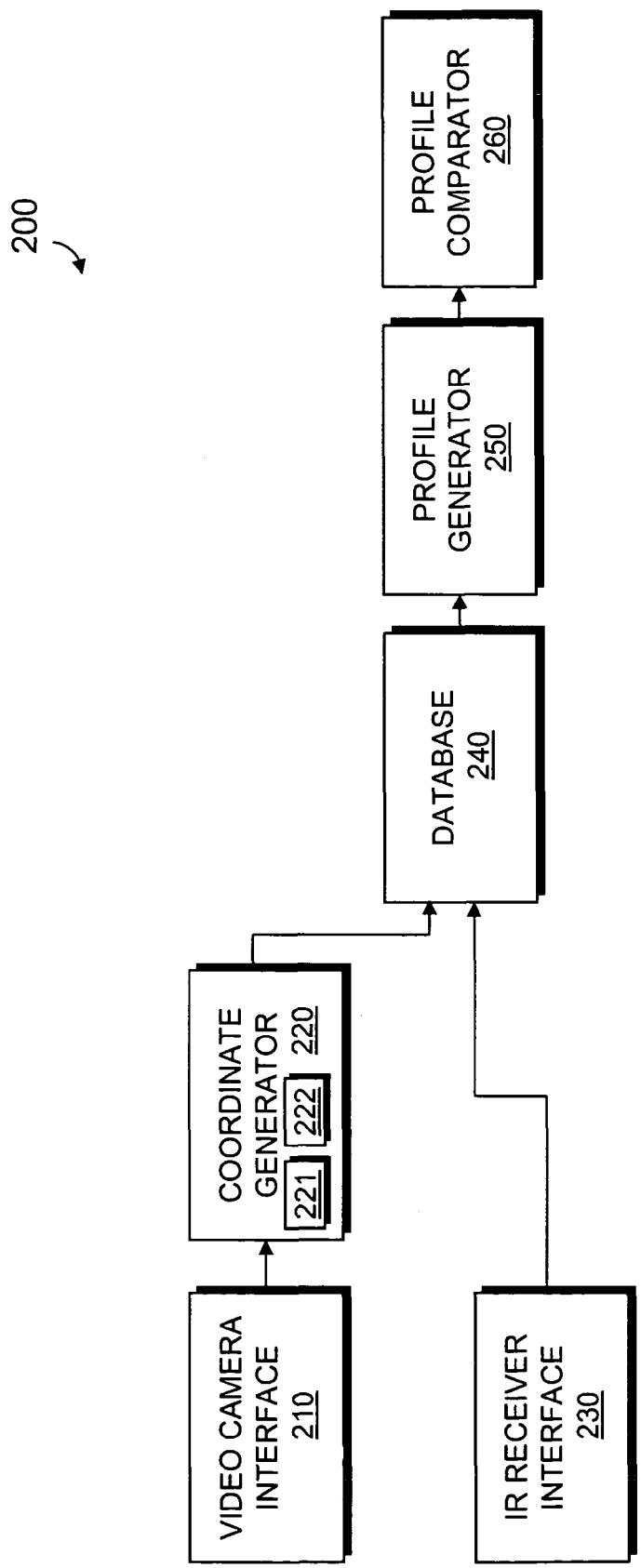
FIG. 2 is a block diagram of a tracking unit according to an embodiment of the present invention.

FIG. 2 is a block diagram of a tracking unit 200 according to an embodiment of the present invention. In an embodiment of the present invention, the tracking unit 200 is implemented in software and resides in main memory 113 (shown in FIG. 1) of the computer system 100 (shown in FIG. 1) as sequences of instructions. It should be appreciated that the modules may be implemented by hardware or a combination of both hardware and software. The tracking unit 200 includes a video camera interface 210. The video camera interface 210 receives image data from the plurality of video cameras 123 (shown in FIG. 1). The image data may include, for example, a plurality of image frames. The video camera interface 210 records a time for each image frame. The time may be associated, for example, with the time the image frame is generated.

The tracking unit 200 includes a coordinate generator 220. The coordinate generator 220 determines a three-dimensional position of an infra-red beacon from images of an infra-red transmission captured by the video cameras 123. The coordinate generator 220 includes an image frame identifier 221 that identifies image frames from the video cameras 123 that capture an image of the infra-red transmission from the infra-red beacon. According to an embodiment of the tracking unit 200, the image frame identifier 221 identifies a first image frame that captures an image of a transmission from an infra-red beacon. The image frame identifier 221 then identifies other image frames generated at the same time as the first image frame that also capture an image of a transmission from an infra-red beacon. Assuming that the infra-red beacon has a unique time signature, the image frames identified should correspond to the same infra-red transmission. The coordinate generator 220 may also utilize knowledge of the sources of the image frames. For example, in identifying image frames associated with infra-red beacons in a first room, the coordinate generator 220 may focus on image frames generated from a first and second camera that are known to be in the first room. Among the image frames generated from the first and second cameras, image frames that capture infra-red signals at a same time are determined to be associated with the same infra-red beacon. The coordinate generator 220 also includes a triangulation unit 222 that receives the image frames identified, and performs triangulation to determine a precise three-dimensional position of the infra-red beacon at a given time.

The tracking unit 200 includes an infra-red receiver interface 230. The infra-red receiver interface 230 receives electrical signals transmitted from the plurality of infra-red receivers 124 (shown in FIG. 1) in response to the infra-red receivers 124 receiving transmissions from infrared beacons. The electrical signals may include an identifier associated with the infra-red beacons detected by infra-red receivers 124. The infra-red receiver interface 230 recognizes the identity of the infra-red receiver transmitting the electrical signal. The infra-red receiver interface 230 records a time associated with the electrical signals. The time may be associated, for example, with the time when the infra-red beacons were detected.

The tracking unit 200 includes a database 240. The database 240 stores information received from the coordinate generator 230 such as where and when an infra-red signal was detected. The database 240 also stores information received from the infra-red receiver interface 230 such as when a specific infra-red beacon was detected. The database 240 may be used to cross-reference the timing information received from the coordinate generator 230 and infra-red receiver interface 230 to link the identity of an infra-red beacon with its position at different times. According to an embodiment of the tracking unit 200, the database 240 may also store information regarding the specific identities of video cameras and infra-red receivers which provided the information used for generating a three-dimensional coordinate.

The tracking unit 200 includes a profile generator 250. The profile generator 250 accesses information in the database 240 to create a historical profile of an infra-red beacon. According to an embodiment of the tracking unit 200, the profile generator 250 may access the database 240 to create a historical profile that includes the three-dimensional position data of specific infra-red beacon over a period of time.

Figure 3:
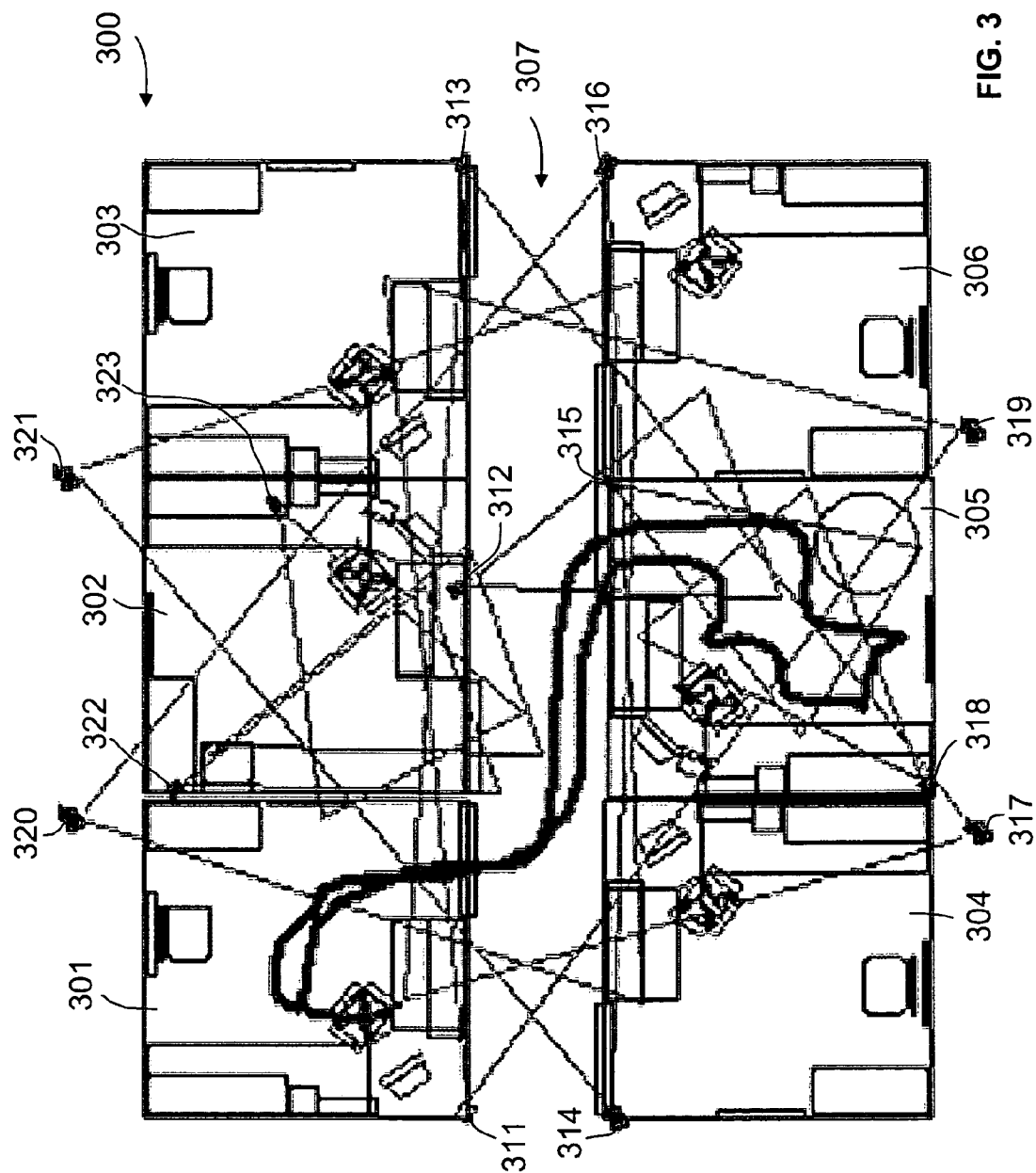
FIG. 3 illustrates an example of the tracking of an infra-red beacon according to an embodiment of the present invention.

FIG. 3 illustrates an example of the spatial resolution of multi-camera tracking as provided by the tracking unit 200 (shown in FIG. 2). FIG. 3 illustrates a two-dimensional floor plan of a work facility 300. The work facility 300 includes a plurality of cubicles 301-306 and an aisle 307. A plurality of video cameras 311-323 and a plurality of infra-red receivers (not shown) are positioned through out the work facility 300. The information accessed from the database 240 (shown in FIG. 2) may be used by the profile generator 250 (shown in FIG. 2) to generate a historical profile of an infra-red beacon over a period of time. The historical profile may illustrate a high degree of spatial resolution that is unavailable from infra-red based monitoring systems that utilize only infra-red transmitters and receivers. For example, where an infra-red based monitoring system that utilizes only infra-red transmitters and receivers may only provide information identifying the cubicle an infra-red beacon is located during a particular time, the tracking unit 200 may provide more specific information such as where in the cubicle the infra-red beacon was detected at a particular time. Although FIG. 3 illustrates a two-dimensional floor plan of a work facility 300, it should be appreciated that other perspectives including a three-dimensional perspective of a historical profile may also be generated by the profile generator 250 according to an embodiment of the present invention.

Referring back to FIG. 2, the tracking unit 200 includes a profile comparator 260. The profile comparator 260 may be used to compare the historical profiles received by the profile generator 250. The historical profiles compared by the profile comparator 260 may be, for example, profiles associated with two different infra-red beacons over a same period of time or the same infra-red beacon over different periods of time. Comparison of the historical profiles may include comparing the three-dimensional position where the IR beacon(s) have been, the duration of time where the IR beacon has been at a particular location, or other types of comparison.

The tracking unit 200 has many potential applications. For example, in an assisted living facility, the profile comparator 260 may be used to compare the historical profile of a person wearing an infra-red beacon during different periods of time. From the comparison, one may be able to determine levels of activity and inactivity which may be indicative of the presence of other issues. The profile comparator 260 may also be used to compare the historical profiles of residents wearing infra-red beacons with staff wearing infra-red beacons to determine which staff member at a given point of time would be in a best position to assist a particular resident.

In addition to supporting the proactive monitoring features, the tracking unit 200 may also support interactive queries. In an embodiment of the present invention where a system operator may interact with the database of recorded locations and identities an operator may access the database 240 to obtain information about the residents in the facility. For example, the system operator may wish to know how much time a given resident spends socializing with other residents. By accessing the database 240, the operator may cross-reference the position of the individual with the identity of the infra-red beacon the individual is wearing and cross-reference the location of that beacon at a given time with the location of beacons worn by other residents. In another example, the system operator may wish to know how much time a given resident spends walking about a room verses sitting in the room. By taking differences between locations of a given infra-red beacon over time, the cumulative distance traveled by the person wearing that beacon can be calculated. Similarly, repetitive actions such as pacing can be automatically differentiated from ordinary walking.

An embodiment of the present invention provides an upgrade path and enables a facility to build a hybrid system utilizing infra-red based data transmission and camera based three-dimensional location tracking where an appropriate level of tracking resolution may be obtained in each monitored location. For instance, a facility with an existing infra-red based monitoring system that provides coarse presence information may upgrade the same system to obtain finer grained information about location and movement. The level of required investment in high-resolution tracking sensors such as cameras is flexible. They may be placed selectively in desired locations without having to upgrade an entire pre-existing system. In addition, the upgrade would not require changing existing IR beacons that are used which may otherwise prove to be inconvenient or disruptive.

It should be appreciated that the video camera interface 210, coordinate generator 220, infra-red receiver interface 230, database 240, profile generator 250, and the profile comparator 260 may be implemented using any known circuitry or technique.

Figure 4:
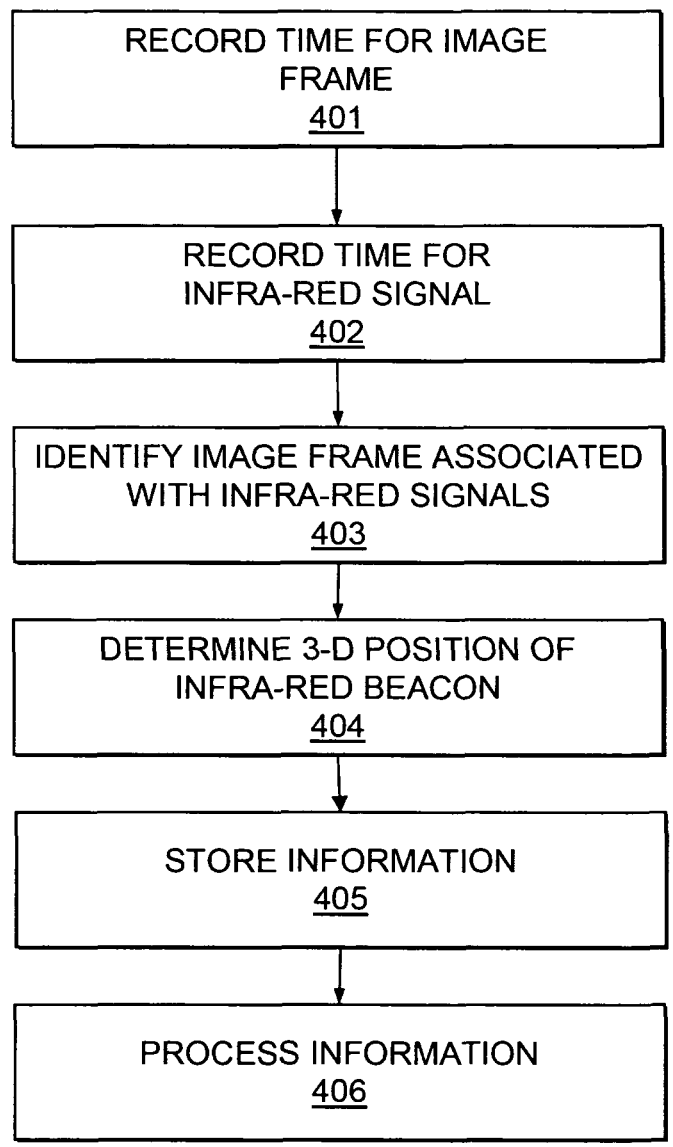
FIG. 4 is a flow chart illustrating a method for managing data for performing tracking of an infra-red beacon according to an embodiment of the present invention.

FIG. 4 is a flow chart illustrating a method for managing data for the three-dimensional tracking of an infra-red beacon according to an embodiment of the present invention. At 401, a time is recorded for image frames generated by video cameras. The time recorded may be, for example, the time associated with when the image frames were generated by the video cameras.

At 402, a time is recorded for an infra-red signal detected by an infra-red receiver. The infra-red signal may be, for example, an encoded signal that identifies the identity of the infra-red beacon that transmitted the signal. The time recorded may be, for example, the time associated with when the infra-red transmission was detected.

At 403, image frames capturing an image of an infra-red transmission from the infra-red beacon are identified. According to an embodiment of the present invention, the infra-red beacon has a unique time signature which allows it to transmit a signal intermittently at a time different from other infra-red beacons. In this embodiment, image frames capturing an image of an infrared transmission at a same time may be associated with the same infra-red beacon. Knowledge of where video cameras are positioned and the overlap regions of the video cameras may be utilized to assist in identifying image frames associated with the same infra-red transmission.

At 404, a three-dimensional position of the infra-red beacon is determined from the identified image frames. According to an embodiment of the present invention, the position of the infra-red transmission in the image frames identified is triangulated to generate a three-dimensional position of the infra-red beacon.

At 405, the information generated is stored. According to an embodiment of the present invention, the information stored includes the three-dimensional position of the infrared beacon, a time associated with when the infra-red beacon was identified at the three-dimensional position, the identity of the infra-red beacon detected by the infra-red receiver, and a time associated with when the infra-red beacon was detected. According to an embodiment of the present invention, the information is stored on a database which may be used to cross-reference the time in which an infra-red beacon is detected by an infra-red receiver and a video camera to link the identity of an infra-red beacon with its position at different times.

At 406, the information stored is processed. According to an embodiment of the present invention, the information is processed to generate a historical profile of the infra-red beacon. The historical profile may include a log of three-dimensional positions of the infra-red beacon over a period of time. The information may be further processed by comparing the historical profile of the infra-red beacon over different periods of time to determine, for example, changes in the beacon holder's routine and behavior. The information may also be processed by comparing the historical profile of two different infra-red beacons over a same period of time to determine, for example, one beacon holder's accessibility to the other. Comparison of historical profiles may include, for example, the comparison of the relative three-dimensional positions of the infra-red beacon and/or the time period the infra-red beacon is at a particular location.

Figure 5:
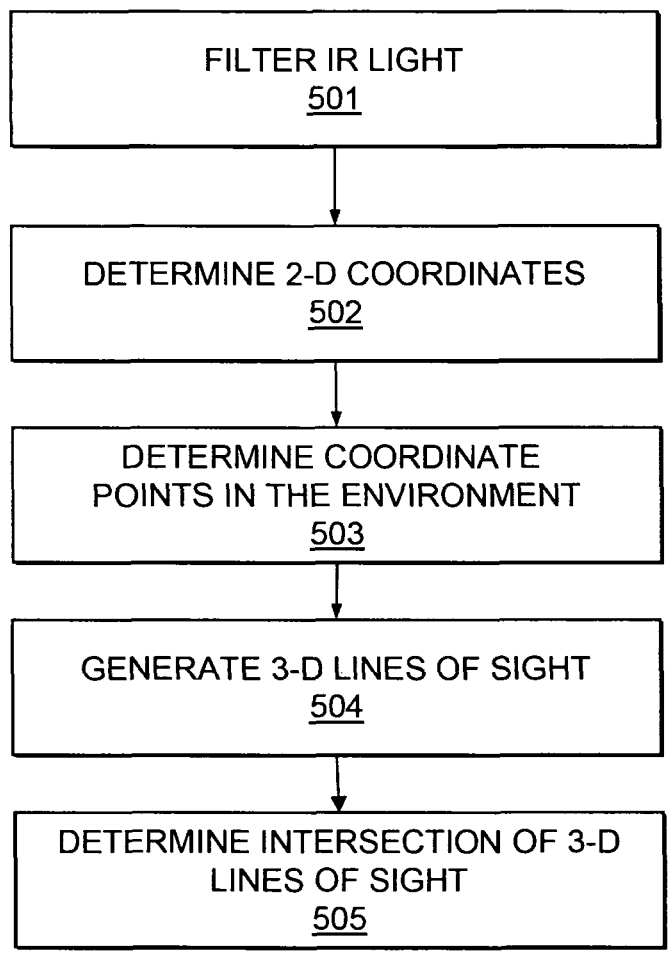
FIG. 5 is a flow chart illustrating a method for triangulating a three-dimensional coordinate of an infra-red beacon according to an embodiment of the present invention.

FIG. 5 is a flow chart illustrating a method for determining the three-dimensional position of an infra-red beacon according to an embodiment of the present invention. This method may be utilized to implement block 404 described in FIG. 4. At 501, filtering of light is performed to capture an image of a transmission from the infra-red beacon. According to an embodiment of the present invention, an infra-red pass filter is implemented.

At 502, two-dimensional coordinates of the infra-red beacon are determined from the images from each video camera. According to an embodiment of the present invention, a feature detection algorithm may be used to process the images.

At 503, the two-dimensional coordinates are transformed to coordinate points in an environment. According to an embodiment of the present invention, the location of the cameras in the environment, the cameras field of view, resolution, and other extrinsic, and intrinsic information about the cameras may be used in transforming the two-dimensional coordinates of the infra-red beacon to coordinate points in the environment.

At 504, a three-dimensional line of sight is generated for each of the coordinate points in the environment to its corresponding originating camera.

At 505, a three-dimensional intersection of the three-dimensional line of sight is determined. The three-dimensional intersection of the three-dimensional line of sights is the three-dimensional position of the infra-red beacon.

FIGS. 4 and 5 are flow charts illustrating a method for managing data for the three-dimensional tracking of an infra-red beacon and a method for determining the three-dimensional position of an infra-red beacon. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

In the foregoing specification embodiments of the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for processing data, comprising:
   identifying time signatures generated by a plurality of infra-red (IR) beacons where each of the time signatures includes a unique IR signal with an identifier transmitted at a unique time; and
   creating a historical profile for the IR beacons based on the time signatures identified, wherein at least one of the identifying and creating procedures is performed by a processor.

2. The method of claim 1, wherein creating the historical profile for the IR beacons comprises generating a log that includes three-dimensional coordinates of positions of the IR beacons over a period of time.

3. The method of claim 1, further comprising comparing a historical profile of a first IR beacon with a previous historical profile of the first IR beacon.

4. The method of claim 1, further comprising comparing a historical profile of a first IR beacon with a historical profile of a second IR beacon.

5. The method of claim 3, wherein comparing the historical profile of the first IR beacon with the previous historical profile of the first IR beacon comprises comparing three dimensional coordinates of the first IR beacon from the historical profile of the first IR beacon with three dimensional coordinates of the first IR beacon from the previous historical profile.

6. The method of claim 3, wherein comparing the historical profile of the first IR beacon with the previous historical profile of the first IR beacon comprises comparing durations of time where the first IR beacon has been at a location.

7. The method of claim 1, further comprising accessing image data associated with the IR beacons using only the time signatures.

8. The method of claim 1, wherein identifying the time signatures of the IR beacons comprises determining when the IR beacons transmit IR identifiers.

9. The method of claim 1, wherein accessing the image data comprises retrieving three-dimensional positions of the IR beacons.

10. The method of claim 7, wherein accessing image data associated with the IR beacons comprises accessing image frames generated from a plurality of cameras detecting IR transmissions at times corresponding to the time signatures.

11. A non-transitory computer-readable medium having stored thereon sequences of instructions, the sequences of instructions including instructions which, when executed by a processor, causes the processor to perform a method comprising:

identifying time signatures generated by a plurality of infra-red (IR) beacons where each of the time signatures includes a unique IR signal with an identifier transmitted at a unique time; and creating a historical profile for the IR beacons based on the time signatures identified.

12. The non-transitory computer-readable medium of claim 11, wherein creating the historical profile for the IR beacons comprises generating a log that includes three-dimensional coordinates of positions of the IR beacons over a period of time.

13. The non-transitory computer-readable medium of claim 11, wherein the method further comprises comparing a historical profile of a first IR beacon with a previous historical profile of the first IR beacon.

14. The non-transitory computer-readable medium of claim 11, wherein the method further comprises comparing to historical profile of a first IR beacon with a historical profile of a second IR beacon.

15. The non-transitory computer-readable medium of claim 13, wherein comparing the historical profile of the first IR beacon with the previous historical profile of the first IR beacon comprises comparing three dimensional coordinates of the first IR beacon from the historical profile of the first IR beacon with three dimensional coordinates of the first IR beacon from the previous historical profile.

16. The non-transitory computer-readable medium of claim 13, wherein comparing the historical profile of the first IR beacon with the previous historical profile of the first IR beacon comprises comparing durations of time where the first IR beacon has been at a location.

17. The non-transitory computer-readable medium of claim 11, wherein the method further comprises identifying image data associated with the IR beacons using the time signatures of the IR beacons.

18. The non-transitory computer-readable medium of claim 17, wherein identifying the time signatures of the IR beacons comprises determining when the IR beacons transmit an IR identifier.

19. The non-transitory computer-readable medium of claim 17, wherein identifying the image data comprises retrieving three-dimensional positions of the IR beacons.

20. A tracking unit implemented by a processor, comprising:

an image frame identifier to identify time signatures generated by a plurality of infra-red (IR) beacons where each of the time signatures includes a unique IR signal with an identifier transmitted at a unique time; and a profile generator to create a historical profile for the IR beacons based on the time signatures identified.

21. The tracking unit of claim 20, further comprising a triangulation unit to access image data associated with the IR beacons using the time signature of the IR beacons to determine a three-dimensional position of the non-stationary IR beacon.

22. The tracking unit of claim 20, wherein one of the IR beacons is attached to a person.

23. The tracking unit of claim 20, wherein one of the IR beacons is attached to an object to be tracked.

24. The method of claim 1, wherein the identifier for each time signature is transmitted at a time different than for any another identifier.

* * * * *